May 6, 1952 A. C. SCHROEDER 2,595,548

PICTURE REPRODUCING APPARATUS

Filed Feb. 24, 1947 2 SHEETS—SHEET 1

INVENTOR
Alfred C. Schroeder
BY H. S. Grover
ATTORNEY

PICTURE REPRODUCING APPARATUS

Filed Feb. 24, 1947 2 SHEETS—SHEET 2

INVENTOR
Alfred C. Schroeder
BY H. S. Grover.
ATTORNEY

Patented May 6, 1952 2,595,548

UNITED STATES PATENT OFFICE 2,595,548

PICTURE REPRODUCING APPARATUS

Alfred C. Schroeder, Feasterville, Pa., assignor to Radio Corporation of America, a corporation of Delaware Application February 24, 1947, Serial No. 730,637

19 Claims. (Cl. 313—92)

My invention relates in general to television apparatus and more particularly to such apparatus as is used to reproduce an image being televised where the signals representing the image in each of a plurality of selected component colors are transmitted simultaneously and the image reproduction occurs simultaneously and the substantially natural color replica is developed by additive color methods.

At the present time, there are two outstanding methods and systems for transmitting and reproducing television images in color. The first of these is the so-called sequential type of transmission and, in this type of transmission, the image to be televised is broken down field by field into selected additive component colors and these color fields are scanned in some preselected sequence. This may be accomplished by the use of a single scansion or camera tube with a series of color filters which are moved between the scansion tube and the image being televised in some definite sequence to divide the image into its component color fields, or the image may be utilized to form several individual image representations in color and each of these may be passed through a fixed color filter to a scansion tube whose function is to develop signals representative of one of the component colors of the image being televised. By appropriate commutating means it can be arranged so that each scansion tube will, in some preselected sequence, scan a field of color and the signals representative of each of the color fields are transmitted sequentially. One sequential type of transmission is shown, for instance, in U. S. Patent 2,413,075, granted December 24, 1946, to Otto H. Schade and entitled "Method and System for Developing Television Signals."

A second type of color transmission contemplates that the image being televised be utilized to form several individual component color images representative thereof simultaneously. This is done usually with the aid of partially transparent reflecting members or dichroic mirrors. By using appropriate component color filters interposed between the optical image and a plurality of cameras, all of the color fields so formed may be scanned and signals representative thereof developed simultaneously. The signals so developed are then transmitted simultaneously. One such transmitting system is shown, for instance, in the article in "Electronic Industries" for December, 1946 at page 58 et seq. The signals so transmitted are reproduced simultaneously and the color fields so formed may be combined to form an optical representation in color of the image being televised. It is one of the objects of this invention to provide apparatus for reproducing the signals transmitted either sequentially or simultaneously to reproduce an optical image which is a simulation of the optical image being televised in its natural colors.

In the apparatus of the prior art, a number of devices for reproducing signal representations so transmitted have been suggested. In one of these arrangements, the signals representative of the component colors are reproduced by separate kinescopes and the images so reproduced may be passed through appropriate color filter means and by the use of appropriate optical systems may be combined. Exact registration of each of the individual color fields is difficult and a plurality of good quality optical systems must be provided. It is, therefore, an object of the present invention to provide an apparatus in which this factor will not constitute a problem. Such a reproducing system is shown schematically, for instance, in the article appearing on page 58 et seq. in the publication "Electronic Industries" for December, 1946.

The art to which this invention belongs also has proposed arrangements in which a plurality of individual electron beams impinge onto appropriate luminescing or fluorescing elements or surfaces and each beam may reproduce one of the selected component color images of the televised picture. One of the disadvantages of this arrangement in the prior art has been the fact that the beams have usually been located at fairly widely divergent positions within the tube and a plurality of beam deflecting systems are necessary with the necessary provision of deflecting generators having differing keystoning characteristics. It is an additional object of my invention to provide an arrangement in which this disadvantage will be overcome.

Another reproducing system has proposed the use of a plurality of electron beams all of which pass to a position under the influence of a single deflecting system and such an arrangement is shown, for instance, in U. S. Patent 2,294,820 to Wilson. In accordance with that invention, each of the scanning beams is utilized to reproduce a complete color field of one of the component colors of the image on a different fluorescent target or screen. Reproduction of the color fields takes place in a sequential fashion as contrasted with the simultaneous reproduction of all component color fields. Among the disadvantages of this arrangement is the fact that the cathode ray beams themselves are developed at fairly widely divergent points and, according to the exemplified showing of that patent, there is actually a cross-over between the beams within the scanning field, causing them to impinge upon and to scan different target areas. In addition, the disadvantage is present that the separately reproduced color fields on the different targets demand the use of optical means to obtain registration of all of the reproduced color fields. It is, therefore, a further object of this invention to provide an apparatus for reproducing a television image in its additive component colors and in which these disadvantages will be eliminated.

In general, my apparatus includes an arrangement in which a plurality of individual electron beams, which are individually and separately modulated with the signals representative of the component color fields of the image being televised, are developed in such a manner that the beams are closely adjacent each other. All of the beams are passed to a position within the influence of a deflecting system which is common to the beams and which simultaneously will deflect all of them. There is, however, no cross-over between the beams while they are within the field of the deflecting system, as there is in the Wilson device.

At the end of the reproducing tube remote from that at which the beams are developed and modulated, there is provided a luminescent target which is constructed so that individual color field lines or individual points of the reproduced image are positioned adjacent each other. Interposed between the target and the cathode ray beams is a foraminous electron beam intercepting structure which is so arranged that the electrons from any one of the beams will reach only definite lines or points of the target and which will reproduce the particular color in accordance with the signal representations with which the particular beam is modulated. This beam-intercepting structure is hereinafter referred to variously as a "masking plate" or "foraminous member."

The target itself may be comprised of a series of parallel lines or strips of luminescent material which will luminesce with a selected particular color under the influence of electron beam impact and, in general, three adjacent parallel strips of luminescent material each will reproduce one of the additive color components of the image being televised to produce a composite line of the image in color and thus registration of the component color fields is accomplished without the use of optical systems. On the other hand, individual points of luminescent material of particular selected color characteristics could be provided on the target, or the screen may be comprised entirely of a luminescent material which will produce white light under the influence of electron beam impact and interposed between the screen and the observing position thereof a series of parallel strips of dye material of a selected color sequence or a series of strips of color filter material are arranged in a selected color sequence.

The arrangement of the electron beam developing means with respect to the target is such that the electron beams will impinge on the target at an acute angle which is very large in value and this arrangement is decidedly advantageous. Additionally, all of the beams are deflected at substantially the same angle and all strike the target at substantially the same angle.

My invention will best be understood by reference to the drawings in which.

Figures 4, 5, 6:
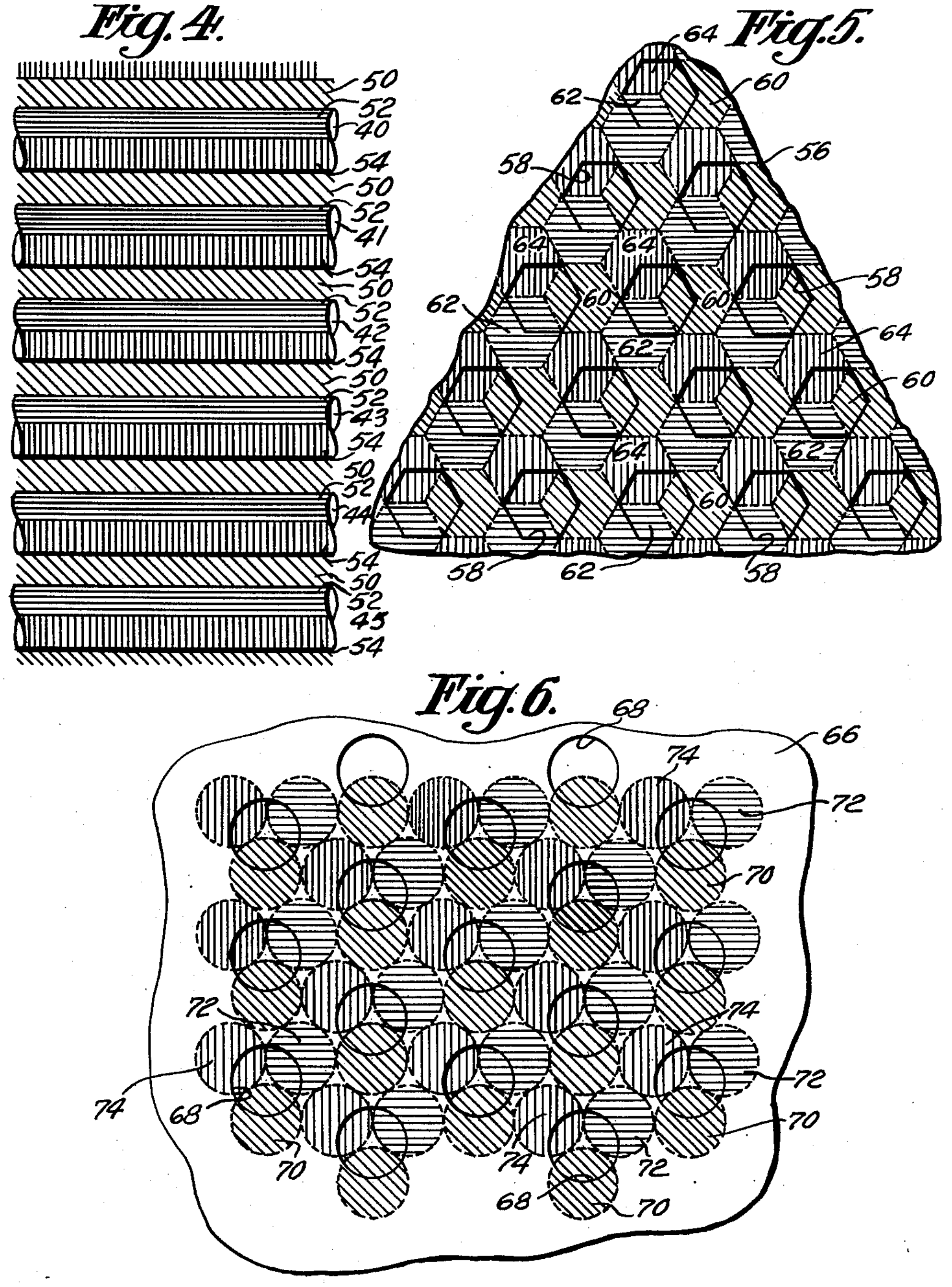
Fig. 4 illustrates schematically the use of adjacent color strips for each of the colors reproduced by a luminescent target and utilizing a plurality of electron guns arranged side by side in a line.

Fig. 5 shows an arrangement consisting of a luminescent target and an electron interceptor and wherein the interceptor comprises a piece of electron opaque material having a series of hexagonally shaped openings therein; and Fig. 6 shows the response of a luminescent target having an electron interceptor positioned between itself and the electron beam source and wherein the electron interceptor comprises a piece of electron opaque material having a plurality of round openings cut in it.

Figure 1:
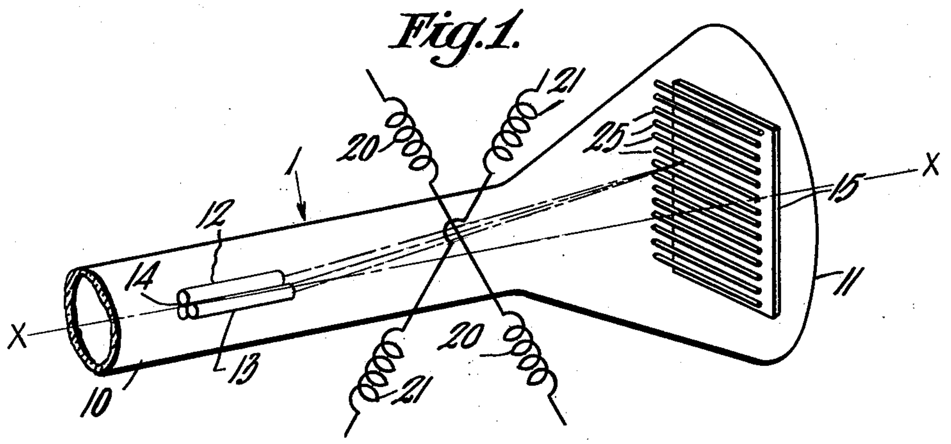
Fig. 1 shows a partial perspective view of an arrangement for reproducing a televised image in a simulation of its natural colors and illustrating the relative positioning between a plurality of electron beam developing means, electron beam deflecting means, a target, and foraminous electron intercepting means in a cathode ray tube.

Referring to Fig. 1, there is shown partially in perspective a view of a cathode ray tube structure for reproducing a televised image in a simulation of its natural colors and which may be used for reproducing signal representations of the component color fields of the image being televised where the signal representations have been transmitted either sequentially or simultaneously. The cathode ray tube shown in Fig. 1 comprises an elongated envelope 1 having a longitudinal axis X—X and which terminates, adjacent to one end, in a neck portion 10 and, adjacent to its other end, in a main chamber or body portion 11. The neck 10 contains three electron gun structures 12, 13, and 14 which are illustrated as being positioned in nested fashion at the corners of an equilateral triangle. Electron guns, as such, are well known and, in general, include means for developing and modulating a cathode ray beam. For purposes of clarity of illustration, the particular elements of the gun have not been shown since such are well known per se. Energizing leads also have been omitted for the same reason.

Each of the electron beams so formed may be modulated by received signal representations of one of the component colors of the optical image being televised. The developed electron beams are directed toward the target 15 of the tube. This target or screen 15 is mounted normal to the longitudinal axis X—X of the tube within the viewing chamber or body portion 11 thereof, and is adapted to luminesce under the influence of electron impact. The beams are directed to a position wherein all of the beams will be influenced simultaneously by the vertical or field deflecting coils 20 and the horizontal or line deflecting coils 21. The beams so formed approach closely to parallelism with each other since the electron guns forming each are positioned immediately adjacent to each other and since the beams are directed so that their impingement onto the target 15 will be very nearly at the same point. It will be appreciated, however, that there is a slight deviation from exact parallelism with such an arrangement, which causes the beams to impinge upon respectively different ones of the color areas on the target or screen 15.

Interposed between the target 15 and the electron guns is a foraminous member for intercepting a portion of the electrons from the beams in accordance with the small angle at which the beams are directed toward the target and by means of which the target is caused to have individual portions thereof responsive to the action of only one of the beams. This foraminous member comprises a series of thin wire members 25 which are arranged so as to be positioned substantially parallel with each other and, in effect, provides an arrangement in which the luminescent target 15 is selective to the direction of the arriving electron beams. This is accomplished due to the fact that the electron intercepting member 25 casts an electron shadow onto the screen so as to cover all but selected parts thereof. The wires comprising the electron intercepting member 25 are made small compared to the size of the electron beam and the diameter of the wires for a three component color system may be made, in general, about twice the width of the opening between individual wires. Other forms of electron interceptors will be indicated hereinafter in Figs. 5 and 6.

Figures 2, 3:
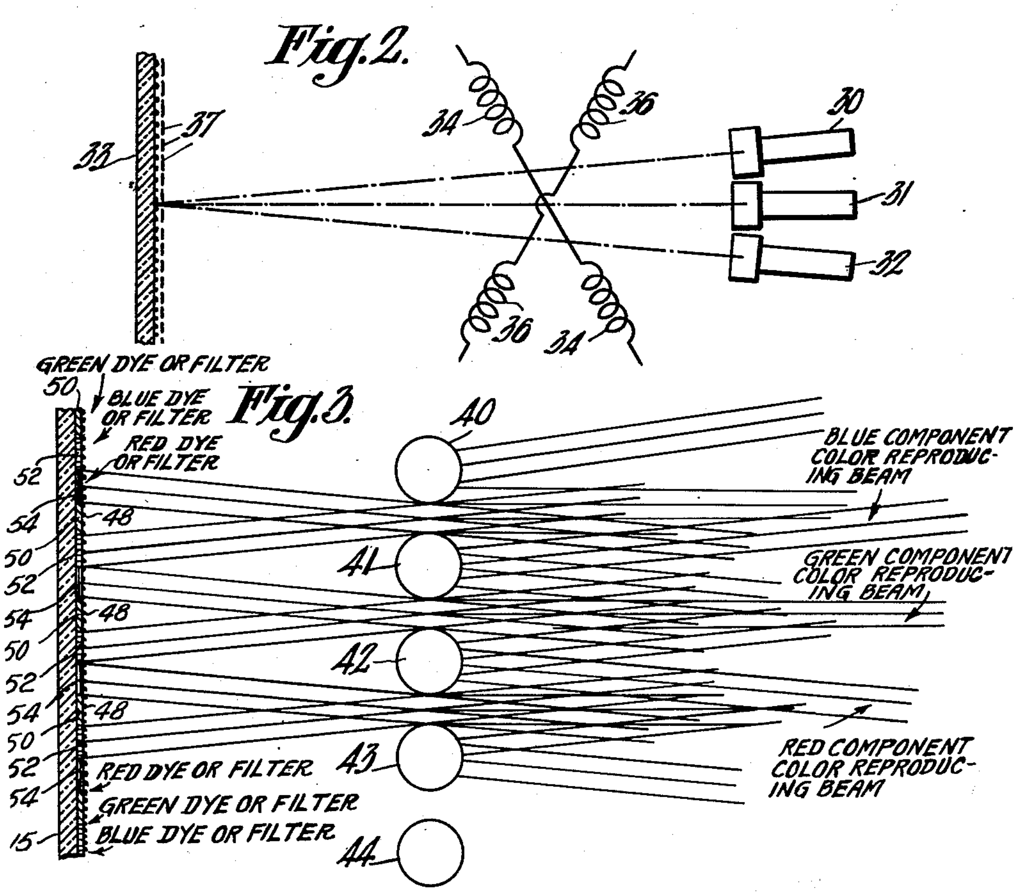
Fig. 2 is a further schematic representation illustrating the relative positioning of electron beam developing and deflecting means and a target with an electron interceptor positioned between the target and the beam developing means in a color reproducer.
Fig. 3 is a schematic showing of a fluorescing target with an electron beam interceptor and illustrating the action of the interceptor.

Referring to Fig. 2, there is shown a schematic representation illustrating the relative positioning of electron beam developing and deflecting means and a target with a foraminous electron interceptor positioned between the target and the beam developing means. In this schematic illustration, three electron guns 30, 31, and 32 are provided and are arranged adjacent each other and positioned so that the three beams emanating therefrom will strike very nearly the same point on a luminescent target area 33. A single deflecting system consisting of pairs of coils 34 and 36 is illustrated and the foraminous electron intercepting member 37, which is interposed between the target 33 and the electron guns, is shown as comprising a series of flat strips. The end view of these strips is illustrated. As illustrated in Fig. 2 color phosphors are applied to the inner face of the target 33; hence no optical color filter is required.

Referring to Fig. 3, there is illustrated schematically the arrangement of the electron beam intercepting means relatively to the target of the tube. In this view, the beam generating and deflecting means have been omitted for purposes of simplicity and each of the beams has been indicated by parallel lines. In the arrangement according to this illustration, the target consists of a phosphor 48 which, when activated under the influence of electron beam impact, produces white light. Interposed between the phosphor 48 and the observing position are green, blue and red color filter strips which, in this case, are illustrated at 50, 52 and 54 respectively, and are appropriately colored dye or other color filter material and, accordingly, to the eye of the observer the color of the light which is reproduced will be that of the dye or other color filter at any particular point. The foraminous electron beam intercepting means is shown on a cutting plane at right angles thereto and the cross-sections of the wires forming the intercepting means are illustrated at 40, 41, 42, 43, and 44. The manner of interception of portions of the beams by the electron beam intercepting means is shown clearly in this illustration. The interceptor should be connected to the second anode.

Referring to Fig. 4, there is illustrated one relative arrangement of the reproduced color strips where the electron guns which reproduce the colors are lined up side by side. The relative positioning of the electron beam intercepting means, as well as the relative size thereof with respect to the reproduced color strips, is shown clearly, the color strips green, blue, and red being indicated at 50, 52, and 54 respectively and the interceptor wires as 40, 41 . . . 44.

Referring to Fig. 5, there is illustrated the relative positioning of each of the reproduced incremental color points or areas with respect to each other where the electron guns reproducing these colors are arranged symmetrically at the corners of an equilateral triangle, as in Fig. 1. The word "points" in the phrase "color points" will be understood to apply to elemental color areas, such as the areas shown in Figs. 5 and 6, having coordinate dimensions both of which are small relative to the overall dimensions of the screen or target electrode upon which said color points are disposed. In this view, a foraminous electron beam intercepting means 56 in the form of a masking plate, having hexagonally shaped openings 58 therein, is used in place of the intercepting means comprising the set of parallel arranged wires of Figs. 1–4. The reproduced color elemental areas of green, blue and red are nested hexagonal-shaped areas and arranged as illustrated by the hatched areas at 60, 62 and 64 respectively and the arrangement of the openings in the electron beam intercepting means 56 will be such as is illustrated by the solid lines.

Referring to Fig. 6, there is shown a view in which the foraminous electron beam intercepting means comprises an electron opaque member or masking plate 66 having circular openings 68 rather than hexagonal openings and the color points or areas reproduced will tend to be circular in shape due to diffusion in the light reproduced by the reproduced target. The openings 68 have been illustrated in solid lines and the reproduced color points have been indicated by hatched areas at 70, 72 and 74 to indicate the colors green, blue and red, respectively.

The lines or paths followed by the electron beams in Figs. 5 and 6 are similar to those shown in Fig. 3. That is to say, the electron beam paths converge toward the groups of elemental areas (60, 62 and 64 of Fig. 5; 70, 72 and 74 of Fig. 6) of the target. The points of impingement of the electron beams on the target define the corners of a triangular figure geometrically similar to, but smaller than, the triangle defined by the beams at their source.

In using phosphors that fluoresce with a definitely colored light under the influence of electron beam impact, there have been used a phosphor consisting of zince sulphide for reproducing the blue color, willemite or zinc cadmium sulphide has been used for reproducing the green and a phosphor comprising zinc sulphide or cadmium sulphide with a trace of silver has been used for reproducing the red. A method of forming a strip-like screen of the nature which has been referred to hereinbefore in this specification as well as the materials for providing the multicolors are set forth in U. S. Patent No. 2,310,863 to Leverenz.

While the suggested component colors have been named as red, green, and blue, it will be understood that any three widely spectrally separated primary colors may be used so long as no two of the selected three can add together to produce the third color.

Subject matter common to this application and to the copending application of Alfred N. Goldsmith, Serial No. 762,175, filed July 19, 1947, (a continuation-in-part of Serial No. 548,239, filed August 5, 1944), and assigned to the same assignee, is claimed in said Goldsmith application.

Having now described the invention, what is claimed and desired to be secured by Letters Patent is the following:

1. An electron discharge tube comprising an envelope, a target mounted within said envelope, said target including phosphor material on one surface thereof, means within said envelope for supplying and directing electrons along a plurality of converging paths toward said target surface, each of said converging paths intercepting said target surface from a different direction, said means including three electron sources spaced from each other in a triangular arrangement, a masking screen having a plurality of apertures and spaced between said target surface and said electron supplying means, the portion of said screen between said apertures constructed and positioned to mask parts of said target surface from all of said electrons except those from one direction, and a common electron deflecting means for simultaneously scanning said electrons over said masking screen.

2. An electron discharge device for reproducing television signals in color, said discharge device comprising, a target including a transparent support and phosphor material on one surface of said support, electron gun means within said envelope for supplying and directing electrons toward said target surface along a plurality of paths, each of said electron paths intercepting said target surface from a different direction, said electron gun means including three electron sources spaced from each other in a triangular arrangement, a masking screen positioned between said electron gun means and said target surface, said masking screen having a plurality of apertures for the passage of electrons through said screen to said target, the portion of said screen between said apertures arranged to mask parts of said target surface from all of said electrons except those from one direction, said phosphor material including a plurality of phosphors having different colored luminescence, each phosphor coating said target surface parts exposed to one of the electron beams, and a single electron deflecting system for scanning said electrons over said masking screen.

3. An electron discharge device for reproducing television signals in color, said discharge device comprising, a target, electron gun means within said envelope for supplying electrons and directing said electrons as beams toward one surface of said target and along a plurality of paths each intercepting said target surface from a different direction, said electron gun means including three electron sources spaced from each other in a triangular arrangement, a masking screen positioned between said electron gun means and said target surface, said masking screen having a plurality of apertures for the passage of electrons through said screen to said target, the portion of said screen between said apertures arranged to mask parts of said target surface from all of said electron beams except that from one direction, common electron deflecting means for scanning said electron beams over said masking screen, a plurality of phosphor materials on said target surface, each of said phosphor materials having a different colored luminescence when exposed to electron bombardment, each of said phosphor materials coating said target surface parts exposed to a different one of said electron beams.

4. An electron discharge device for reproducing television signals in color, said discharge device comprising an envelope, a target electrode within said envelope, said target electrode including a support plate, a phosphor coating on one surface of said plate and filters of different colors between said phosphor coating and said support plate surface, means within said envelope for supplying electrons and directing said electrons toward said target plate surface along a plurality of paths intercepting said plate surface from different directions, said means including three electron sources spaced from each other in a triangular arrangement, an apertured masking screen positioned between said target plate surface and said electron supplying means, said screen constructed and arranged to mask the portion of said phosphor coating over each of said color filters from all of said electrons except those from one direction, means common to all said electrons for scanning said electrons over said masking screen.

5. An electron discharge device for reproducing television signals in color, said discharge device comprising an envelope, a target electrode within said envelope, said target including a support plate, a phosphor coating on one surface of said plate and a plurality of color filters between said phosphor coating and said support plate surface, adjacent ones of said filters being of a different color, means within said envelope for supplying electrons and directing said electrons toward said target plate surface along a plurality of paths intercepting said plate surface from a different direction, said means including three electron sources spaced from each other in a triangular arrangement, an apertured masking screen positioned between said target plate surface and said electron supplying means, said masking screen including a plurality of apertures for the passage of electrons through said screen, said screen arranged to mask the portion of said phosphor coating over each filter from all of said electrons except those from one direction, common means for scanning said electrons over said masking screen.

6. An electron discharge device for reproducing television signals in color, said discharge device comprising an envelope, a target electrode within said envelope, said target including a transparent support plate, means within said envelope for producing a plurality of modulated electron beams and for directing each of said electron beams along a different path toward and intercepting a surface of said target from a different direction, said means including three electron sources spaced from each other in a triangular arrangement, a masking screen positioned between said electron gun means and said target surface, said masking screen having a plurality of apertures for the passage of said electron beams through said screen to said target, the portion of said screen between said apertures constructed and arranged to mask parts of said target surface from all except one of said electron beams, a single electron deflecting system for scanning said electron beams over said masking screen, a plurality of phosphor materials on the parts of said target surface adjacent each of said apertures, each of said phosphor materials having a different colored luminescence when exposed to electron bombardment, each of said phosphor materials coating said target surface parts exposed to a different one of said electron beams, said phosphor materials adjacent each of said apertures being in a triangular arrangement similar to that of said electron sources.

7. An electron discharge device for reproducing television signals in color, said discharge device comprising, an envelope, a target electrode within said envelope, said target including a transparent support plate and a phosphor coating on one surface of said support plate, three electron guns within said envelope spaced from each other in a triangular arrangement, each of said guns being constructed and arranged to develop a beam of electrons modulated according to television signals corresponding to a component color of an optical image, each of said electron guns including means to direct its electron beam toward and intercepting said target surface at a common point of convergence from a different direction, a masking screen positioned between said electron guns and said target surface, said masking screen having a plurality of apertures for the passage of said electron beams through said screen to said target, the portions of said screen between said apertures constructed and arranged to mask parts of said target surface from all except one of said electron beams, a common means for scanning said electron beams over said masking screen, a color filter between the phosphor coating on each of said target surface parts and said transparent support, said target surface parts adjacent each aperture of said screen having a triangular arrangement similar to that of said electron guns, the filters in each triangular target surface part arrangement being of different colors.

8. An electron discharge device for reproducing television signals in color, said discharge device comprising an envelope, a target electrode within said envelope, said target electrode including a support plate, a phosphor coating on one surface of said plate and contiguous areas of color filter between said phosphor coating and said support plate surface, adjacent ones of said filter areas being of a different color filter, means within said envelope for supplying electrons, said means including three electron sources spaced from each other in a triangular arrangement, an apertured masking screen positioned between said target plate surface and said electron supplying means, means for directing said electrons along a plurality of converging paths, each of said paths intercepting said masking screen and said target surface from a different direction, said screen constructed and arranged to mask a portion of said phosphor coating over each of said contiguous filter areas from all of said electrons except those from one direction, common means for causing said electrons to scan said masking screen.

9. An electron discharge tube comprising an envelope, a target mounted within said envelope, said target including phosphor material on one surface thereof, means within said envelope for supplying and directing electrons toward said target along a plurality of converging paths spaced from each other in a triangular arrangement, a masking screen having a plurality of apertures and spaced between said target surface and said electron supplying means, the portion of said screen between said apertures constructed and positioned to mask parts of said target surface from all of said electrons except those from one direction, and a common electron deflecting means for simultaneously scanning said electrons over said masking screen.

10. An electron discharge tube comprising an envelope, a target mounted within said envelope, said targe including a phosphor coating on one surface thereof, means within said envelope for supplying and directing electrons along a plurality of converging paths toward said target surface, each of said paths intercepting said target surface from a different direction, a masking screen having a plurality of hexagonal-shaped apertures, said masking screen spaced from said target surface and between said target and said electron supplying means, the portion of said screen between said apertures constructed and positioned to mask each part of said phosphor coated target surface from all of said electrons except those from one direction, common electron deflecting means for causing said electrons to scan said masking screen.

11. An electron discharge device for reproducing television signals in color, said discharge device comprising, a target including a transparent support and a phosphor coating on one surface of said support, electron gun means within said envelope for supplying electrons and directing said electrons toward said target surface along a plurality of converging paths, each of said converging paths intercepting said target surface from a different direction, a masking screen positioned between said electron gun means and said target surface, said masking screen having a plurality of hexagonal-shaped apertures for the passage of electrons through said screen to said target, the portion of said screen between said apertures arranged to mask each part of said phosphor coated target surface from all of said electrons except those from one direction, common electron deflecting means for causing said electrons to scan said masking screen.

12. An electron discharge device for reproducing television signals in color, said descharge device comprising an envelope, a target electrode within said envelope, said target electrode including a transparent support plate and a phosphor coating on one surface of said support plate, a plurality of electron guns within said envelope, each of said guns being constructed and arranged to develop a beam of electrons modulated according to television signals corresponding to a component color of an optical image, each of said electron guns including means to direct its electron beam toward said target plate surface, each of said electron beams intercepting said target surface at a common point of convergence from a different direction, a masking screen positioned between said electron guns and said target surface, said masking screen having a plurality of hexagonal shaped apertures for the passage of said electron beams through said screen to said target, the portions of said screen between said apertures constructed and arranged to mask each part of said phosphor coated target surface from all except one of said electron beams, common for scanning said electron beams over said masking screen, a plurality of color filters one of said color filters between the phosphor coating on each part of said target surface and said transparent support, adjacent ones of said filters passing light of a different component color from said phosphor.

13. An electron discharge device for reproducing television signals in color, said discharge device comprising an envelope, a target electrode within said envelope, said target electrode including a transparent support plate and a phosphor coating on one surface of said support plate, a plurality of electron guns within said envelope, each of said guns being constructed and arranged to develop a beam of electrons modulated according to television signals corresponding to a component color of an optical image, each of said electron guns including means to direct its electron beam toward said target plate surface, each of said electron beams intercepting said target surface at a common point of convergence and from a different direction, a masking screen positioned between said electron guns and said target surface, said masking screen having a plurality of hexagonal shaped apertures for the passage of said electron beams through said screen to said target, the portions of said screen between said apertures constructed and arranged to mask each part of said phosphor coated target surface from all except one of said electron beams, common means for scanning said electron beams over said masking screen, the phosphor coating of adjacent ones of each of said masked parts of said phosphor coated target surface consisting of a phosphor material having a different colored fluorescence under electron bombardment.

14. An electron discharge tube comprising an envelope, a target mounted within said envelope, said target including phosphor material on one surface thereof, means including three electron guns within said envelope spaced from each other in a triangular arrangement for supplying and directing electrons toward said target along three different converging paths, a masking screen having a plurality of apertures and spaced between said target surface and said electron guns, the portion of said screen between said apertures constructed and positioned to mask parts of said target surface from all of said electrons except those from one direction, and a common electron deflecting means for simultaneously scanning said electrons over said masking screen.

15. An electron discharge device comprising an envelope, a target mounted within said envelope, means within said envelope for supplying and directing electrons toward said target along a plurality of convergent paths spaced from each other in a polygonal arrangement, a masking screen having a plurality of apertures and spaced between said target and said electron supplying means, the portion of said screen between said apertures constructed and positioned to mask parts of said target from all of said electrons except those from one direction, a plurality of phosphor materials on the parts of said target adjacent each of said apertures, each of said phosphor materials having a different colored luminescence when exposed to electron bombardment, each of said phosphor materials being exposed to electrons along a different one of said converging paths, said phosphor materials adjacent each of said apertures being in a polygonal arrangement similar to that of said paths, and a common electron deflecting means for simultaneously scanning said electrons over said masking screen.

16. An electron beam tube comprising an evacuated envelope having a main chamber and a neck of reduced diameter communicating with said main chamber, a target assembly including a foraminous electrode and a target electrode mounted in said main chamber facing said neck, said target electrode including a multiplicity of duplicate groups of at least three ray-sensitive target areas of different color-response characteristics and said foraminous electrode containing a multiplicity of apertures disposed in a pattern corresponding to the pattern of distribution of said groups of ray-sensitive target areas, a plurality of electron guns corresponding in number to the number of different target areas in a single one of said groups mounted in closely spaced array about a common axis in said neck each in a position to scan all target areas of a particular color-response characteristic, and common deflecting means disposed about said axis for imparting a scanning movement to the electron beams from said plurality of electron guns.

17. An electron beam tube in accordance with claim 16 wherein each of said groups of ray sensitive target areas consists of three target areas each of a different primary-color characteristic and said plurality of electron guns consist of three guns disposed at the corners of a triangle centered on said axis.

18. An electron beam tube as set forth in claim 16 and wherein each of said groups of ray sensitive target areas consists of three closely spaced parallel, line-like areas each of a different primary-color response characteristic with the lines of one group disposed parallel to the lines of the other groups in a repetitive pattern.

19. An electron beam tube as set forth in claim 16, wherein said groups of ray-sensitive areas are disposed in hexagonal array on said target, wherein each of said groups comprises three triangularly arranged areas of sub-elemental image dimensions, and wherein said corresponding number of electron guns are disposed at the corners of a triangle similar to the triangle of the pattern in which said three sub-elemental target areas are arranged.

ALFRED C. SCHROEDER.

REFERENCES CITED

The following references are of record in the file of this patent:

UNITED STATES PATENTS

| Number | Name | Date |
|---|---|---|
| 2,137,888 | Fuller | Nov. 22, 1938 |
| 2,179,205 | Toulon | Nov. 7, 1939 |
| 2,200,285 | Lorenzen | May 14, 1940 |
| 2,211,066 | Maguire | Aug. 13, 1940 |
| 2,294,820 | Wilson | Sept. 1, 1942 |
| 2,296,908 | Crosby | Sept 29, 1942 |
| 2,307,188 | Bedford | Jan. 5, 1943 |
| 2,310,863 | Leverenz | Feb. 9, 1943 |
| 2,312,792 | Bamford | Mar. 2, 1943 |
| 2,343,825 | Wilson | Mar. 7, 1944 |
| 2,416,056 | Kallmann | Feb. 18, 1947 |
| 2,423,830 | Fonda | July 15, 1947 |
| 2,431,115 | Goldsmith | Nov. 18, 1947 |
| 2,446,249 | Schroeder | Aug. 3, 1948 |
| 2,446,440 | Swedlund | Aug. 3, 1948 |

FOREIGN PATENTS

| Number | Country | Date |
|---|---|---|
| 866,065 | France | Mar. 31, 1941 |
| 210,628 | Switzerland | Oct. 1, 1940 |
| 23,154/35 | Australia | July 30, 1936 |